United States Patent
Liang et al.

(10) Patent No.: US 8,181,758 B2
(45) Date of Patent: May 22, 2012

(54) DAMPING DEVICE

(75) Inventors: Hsiu-Chiang Liang, Kaohsiung Hsien (TW); Ken-Ching Chen, Kaohsiung Hsien (TW); Chun-Chiang Wang, Kaohsiung Hsien (TW)

(73) Assignee: King Slide Works Co., Ltd., Kaohsiung Hsien (TW)

( * ) Notice: Subject to any disclaimer, the term of this patent is extended or adjusted under 35 U.S.C. 154(b) by 364 days.

(21) Appl. No.: 12/461,483

(22) Filed: Aug. 13, 2009

(65) Prior Publication Data

US 2010/0038197 A1 Feb. 18, 2010

(30) Foreign Application Priority Data

Aug. 18, 2008 (TW) ................................ 97131515 A

(51) Int. Cl.
*F16F 9/348* (2006.01)
(52) U.S. Cl. ................. 188/322.15; 188/284; 188/282.6
(58) Field of Classification Search ............... 188/282.5, 188/282.6, 322.15, 284; 267/226
See application file for complete search history.

(56) References Cited

U.S. PATENT DOCUMENTS

| | | | | |
|---|---|---|---|---|
| 5,927,448 A * | 7/1999 | Yamazaki | ..................... | 188/281 |
| 6,802,408 B2 | 10/2004 | Krammer | | |
| 7,913,361 B2 * | 3/2011 | Tomiji | ............................. | 16/412 |
| 2002/0010977 A1 * | 1/2002 | Salice | ................. | 16/49 |
| 2005/0269176 A1 * | 12/2005 | Tomiji et al. | .................. | 188/284 |
| 2009/0271946 A1 * | 11/2009 | Lam et al. | ......................... | 16/84 |

FOREIGN PATENT DOCUMENTS

| | | |
|---|---|---|
| TW | M327191 | 2/2008 |
| TW | M327912 | 3/2008 |
| TW | M329378 | 4/2008 |
| TW | M331331 | 5/2008 |

* cited by examiner

*Primary Examiner* — Bradley King
(74) *Attorney, Agent, or Firm* — Rosenberg, Klein & Lee

(57) ABSTRACT

A damping device includes a cylinder in which a resilient member and a piston are received. A cover assembly and a seal member seal the cylinder and damping medium is filled in the cylinder. The piston includes a piston body, a connecting portion connected with one end of the resilient member, and a neck portion connected between the piston body and the connecting portion. The piston body has an opening penetrating through the piston body. A control valve is movably mounted to the neck portion to control the opening during operation. A piston rod has one end connected with the piston body and another end extending out from the cylinder. A damping member is located between the piston and the cover assembly. The traveling velocity of the piston is controlled by the control valve to close or to open the opening through which the damping medium passes.

14 Claims, 3 Drawing Sheets

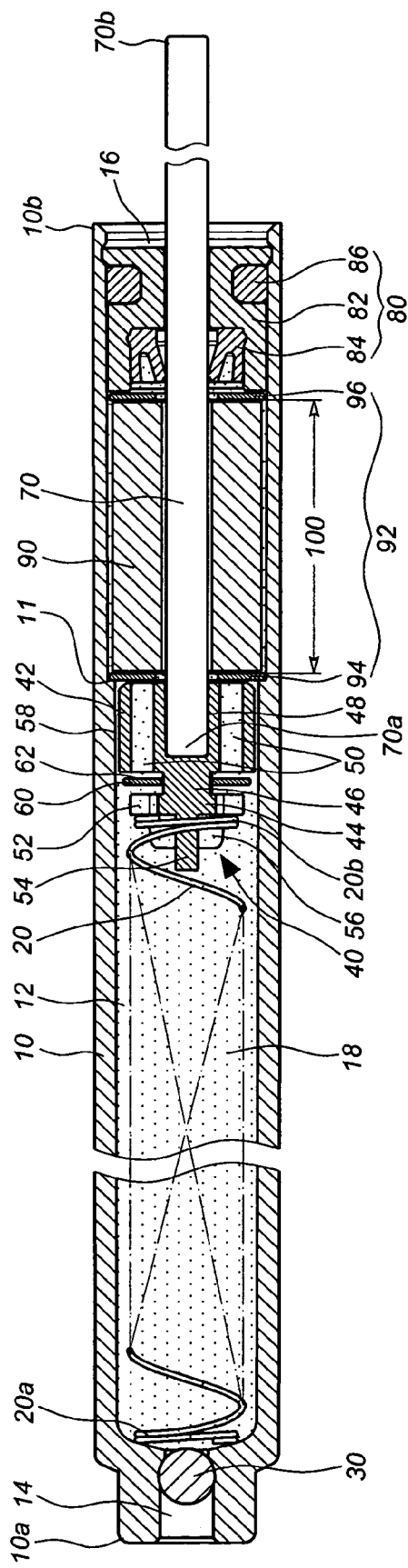
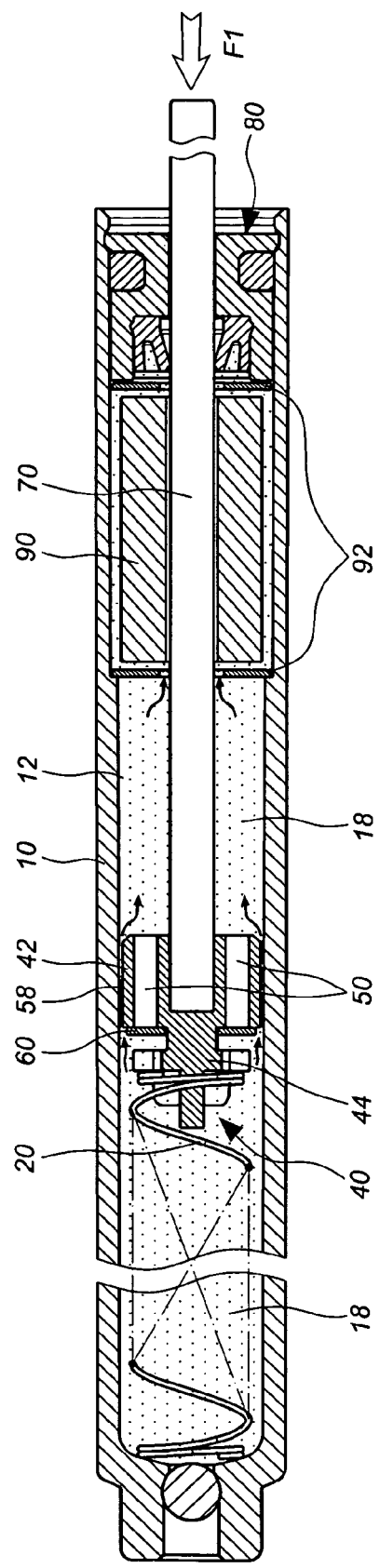
FIG. 2
FIG. 3

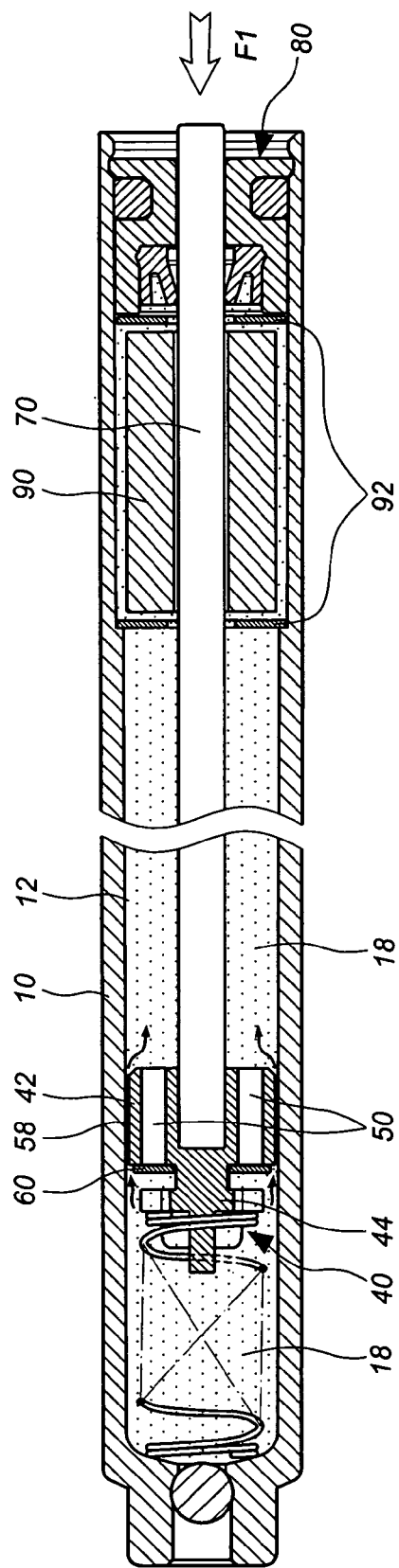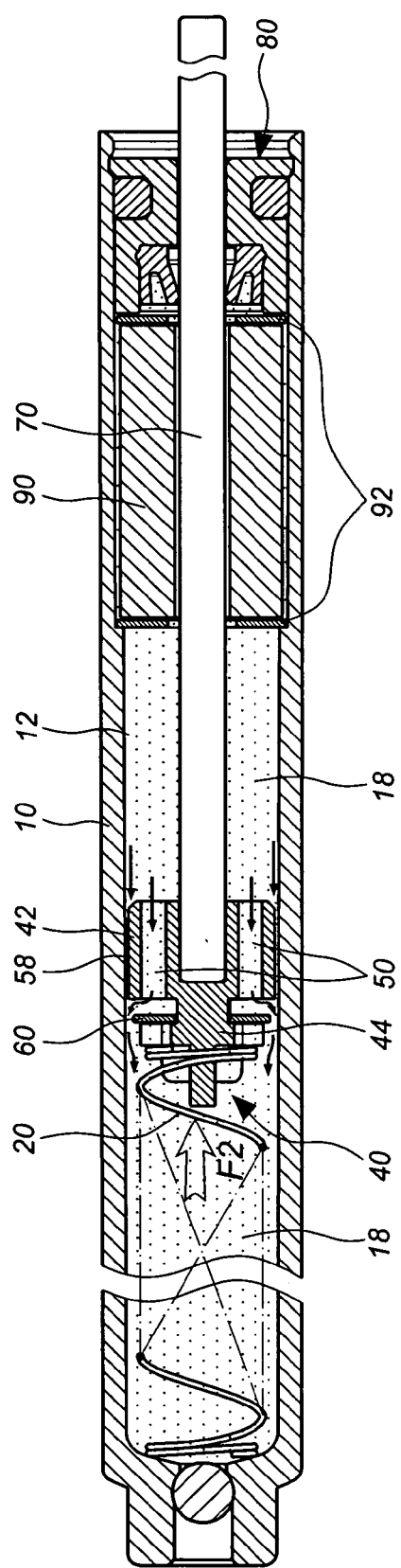

DAMPING DEVICE

FIELD OF THE INVENTION

The present invention relates to a damping device, and more particularly, to a damping device for movable parts of furniture.

BACKGROUND OF THE INVENTION

A conventional damping device is disclosed in U.S. Pat. No. 6,802,408 titled "Fluid Damper, Particularly For Movable Pieces Of Furniture" to Krammer, wherein the damper includes a piston composed of multiple ring disks located within an interior space of a cylinder, and at least two of the ring disks have a hole through which the damping fluid passes such that the piston moves in the interior space to reduce the speed of the movable pieces.

Besides, Taiwan Patent Nos. M327191, M327912, M329378, and M331331 also disclose damping devices and are referenced when the invention is made.

SUMMARY OF THE INVENTION

The present invention intends to provide a damping device for movable parts of furniture and a piston moves slower when the parts are applied by a force from outside and faster when the force from outside is disappeared.

According to the present invention, there is provided a damping device comprising a cylinder having a first end and a second end opposite to the first end, an interior space defined within the cylinder, the first end having a first hole interconnecting with the interior space, the second end having a second hole interconnecting with the interior space, damping medium filled within the interior space; a resilient member located in the interior space and having a first end and a second end opposite to the first end, the first end of the resilient member contacting against an inside of the first end of the cylinder; a seal member sealing the first hole in the first end of the cylinder; a piston movably received in the interior space and urged by the second end of the resilient member, the piston including a piston body, a connection portion and a neck portion connected between the piston body and the connection portion, the second end of the resilient member connected to the connection portion, the piston body having a recess and at least one opening penetrating through the piston body, the connection portion having at least one notch corresponding in position to the opening, a gap defined between the piston and an inner periphery of the interior space; a control valve movably connected to the neck portion of the piston and having a contact surface which faces the opening of the piston body; a piston rod located in the interior space and having a first end and a second end opposite to the first end, the first end of the piston rod engaged with the recess of the piston body and the second end of the piston rod extending out from the second end of the cylinder; a cover assembly sealing the second hole in the second end of the cylinder and including a hollow mounting member which is fixed to the cylinder, a first resilient ring received in the mounting member and connected with the piston rod, and a second resilient ring fitted on an outside of the mounting member and in contact with the inner periphery of the interior space, and a damping member located between the piston and the cover assembly.

Preferably, the damping device further comprises a support member located in the interior space, the support member including a first end plate, a second end plate, a connection plate which is connected between the first end plate and the second end plate, and a space defined among the first end plate, the second end plate, and the connection plate, the damping member being received in the space.

Preferably, the first end plate and the second end plate have through holes for insertion of the piston rod.

Preferably, the inner periphery of the interior space of the cylinder is formed with a shoulder and one end of the support member located in the interior space is engaged with the shoulder.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 is a cross-sectional view of the damping device according to the preferred embodiment of the present invention;

FIG. 3 is a cross-sectional view of the damping device according to the preferred embodiment of the present invention, wherein a piston rod is applied by a force F1;

FIG. 4 is a cross-sectional view of the damping device according to the preferred embodiment of the present invention, wherein the piston rod is moved to push a piston by the force F1, and FIG. 5 is a cross-sectional view of the damping device according to the preferred embodiment of the present invention, wherein the force F1 is disappeared and a resilient member pushes the piston backward.

DETAILED DESCRIPTION OF THE PREFERRED EMBODIMENT

Figure 1:
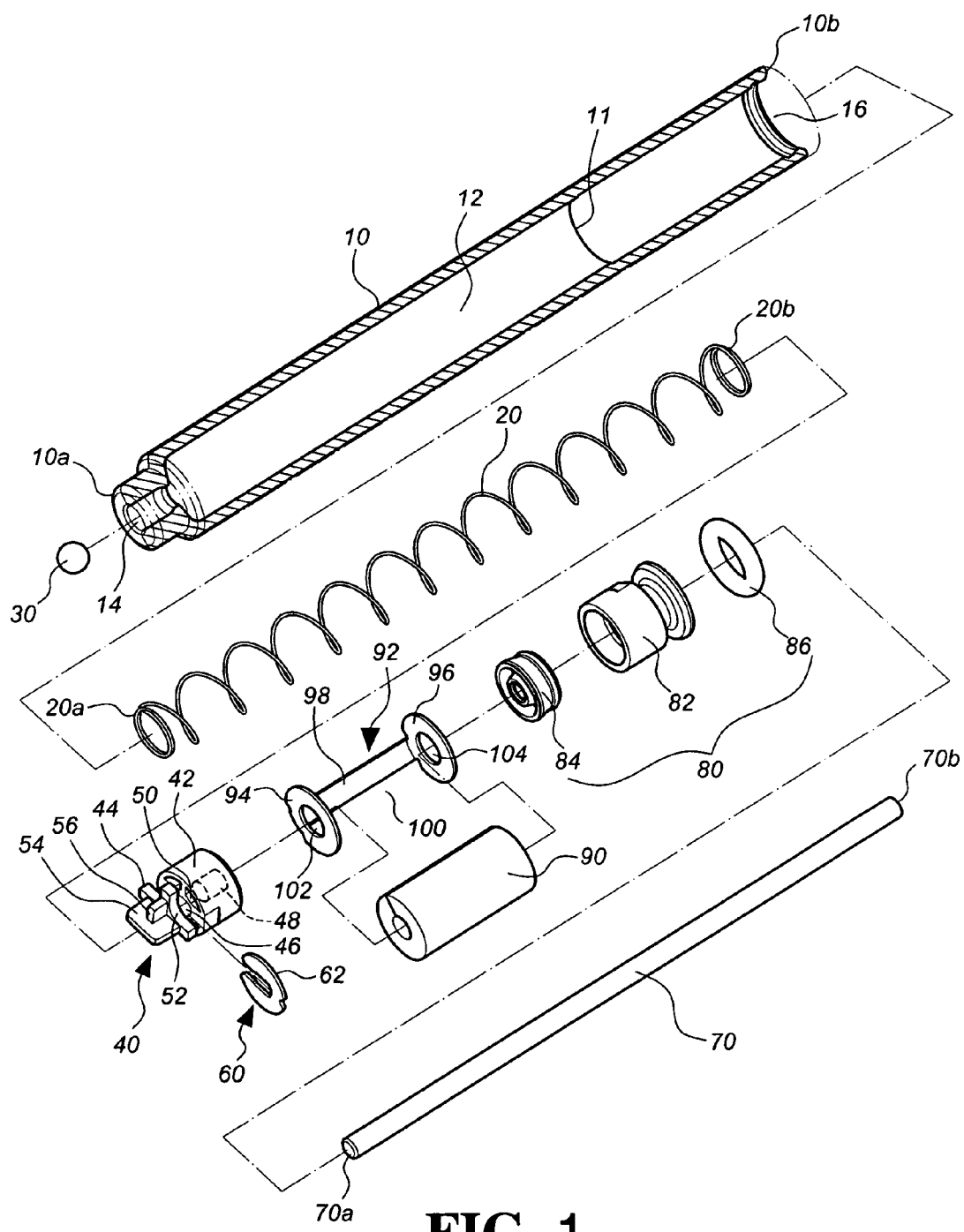
FIG. 1 is an exploded view of a damping device according to a preferred embodiment of the present invention.

Referring to FIGS. 1 and 2, a damping device of the present invention comprises a cylinder 10, a resilient member 20, a seal member 30, a piston 40, a control valve 60, a piston rod 70, a cover assembly 80, a damping member 90, and a support member 92.

The cylinder 10 has a first end 10a, a second end 10b opposite to the first end 10a, and an interior space 12 defined within the cylinder 10. The first end 10a has a first hole 14 interconnecting with the interior space 12, and the second end 10b has a second hole 16 interconnecting with the interior space 12. Damping medium 18 such as fluid is filled within the interior space 12.

The resilient member 20 is located in the interior space 12 and has a first end 20a and a second end 20b opposite to the first end 20a. The first end 20a of the resilient member 20 contacts against an inside of the first end 10a of the cylinder 10.

The seal member 30 is located in the first hole 14 and seals the first hole 14 in the first end 10a of the cylinder 10. In this embodiment, the seal member 30 is a spherical member.

The piston 40 is movably received in the interior space 12 and urged by the second end 20b of the resilient member 20. The piston 40 includes a piston body 42, a connection portion 44 and a neck portion 46 which is connected between the piston body 42 and the connection portion 44. The piston body 42 has a recess 48 and a plurality of openings 50 penetrating through the piston body 42. The connection portion 44 includes a plurality of notches 52 corresponding in position to the openings 50. The connection portion 44 further includes a first plate 54 and a second plate 56 which is perpendicularly connected to the first plate 54. The second end 20b of the resilient member 20 is connected to the first end plate 54 and the second plate 56. A gap 58 is defined between the piston 40 and an inner periphery of the interior space 12 so that the piston 40 can move within the interior space 12.

The control valve 60 is movably connected to the neck portion 46 of the piston 40, and has a contact surface 62 which faces the openings 50 of the piston body 42. In this embodiment, the control valve 60 is a C-shaped metal plate.

The piston rod 70 is located in the interior space 12, and has a first end 70a and a second end 70b opposite to the first end 70a. The first end 70a of the piston rod 70 is engaged with the recess 48 of the piston body 42 and the second end 70b of the piston rod 70 extends out from the second end 10b of the cylinder 10.

The cover assembly 80 seals the second hole 16 in the second end 10b of the cylinder 10, and includes a hollow mounting member 82, a first resilient ring 84, and a second resilient ring 86. The mounting member 82 is fixed in the second hole 16 of the cylinder 10. The first resilient ring 84 is received in the mounting member 82 and connected with the piston rod 70. The second resilient ring 86 is fitted on an outside of the mounting member 82 and in contact with the inner periphery of the interior space 12.

The damping member 90 is located between the piston 40 and the cover assembly 80 so as to reduce the impact due to movement of the damping medium 18. In this embodiment, the damping member 90 is a sponge.

The support member 92 is located in the interior space 12, and includes a first end plate 94, a second end plate 96 and a connection plate 98 which is connected between the first end plate 94 and the second end plate 96. A space 100 is defined among the first end plate 94, the second end plate 96, and the connection plate 98. The damping member 90 is received in the space 100. The first and second end plates 94, 96 each have a through hole 102, 104, and the piston rod 70 extends through the through holes 102, 104 of the first and second end plates 94, 96. Preferably, the inner periphery of the interior space 12 of the cylinder 10 is formed with a shoulder 11 so that one end of the support member 92 located in the interior space 12 is engaged with the shoulder 11.

The resilient member 20 applies a force to the piston rod 70 which tends to extend out from the second end 10b of the cylinder 10.

As shown in FIGS. 3 and 4, when the piston rod 70 is applied by a force F1, the piston 40 is moved by the piston rod 70 and the connection portion 44 compresses the resilient member 20 which is deformed to store energy. When the piston 40 moves, the damping medium 18 moves the control valve 60 toward the piston body 42 and the control valve 60 contacts the piston body 42 to seal the openings 50. The damping medium 18 cannot enter the openings 50, or limited amount of the damping medium can enter the openings 50. Most of the damping medium 18 is forced to flow through the gap 58 and enters into the interior space 12 between the piston 40 and the cover assembly 80. Because the gap 58 is small so that the piston rod 70 moves at a low speed and performs the damping feature. If the damping medium 18 flows into the interior space 12 between the piston 40 and the cover assembly 80 too much in a short period of time, the damping medium 18 compresses the damping member 90 to reduce the pressure in the interior space 12 between the piston 40 and the cover assembly 80. The damping member 90 is positioned within the support member 92 which is positioned by the shoulder 11 so that the damping member 90 does not shift in the cylinder 10.

As shown in FIG. 5, after the force F1 is disappeared, the resilient member 20 releases the stored energy to apply a force F2 to the piston 40 which moves toward the second end 10b of the cylinder 10 so that the damping medium 18 passes through the openings 50 and pushes the control valve 60 away from the openings 50. Therefore, the damping medium 18 can be quickly removed from the interior space 12 between the piston 40 and the cover assembly 80. In other words, the traveling velocity of the piston rod 70 moves faster when the force F1 is disappeared.

The number of the opening 50 can be only one and the number of the notch 52 can be one to match with the opening 50.

While we have shown and described the embodiment in accordance with the present invention, it should be clear to those skilled in the art that further embodiments may be made without departing from the scope of the present invention.

What is claimed is:

1. A damping device comprising:
    a cylinder having a first end and a second end opposite to the first end, an interior space defined within the cylinder, the first end having a first hole interconnecting with the interior space, the second end having a second hole interconnecting with the interior space, damping medium filled within the interior space;
    a resilient member located in the interior space and having a first end and a second end opposite to the first end, the first end of the resilient member contacting against an inside of the first end of the cylinder;
    a seal member sealing the first hole in the first end of the cylinder;
    a piston movably received in the interior space and urged by the second end of the resilient member, the piston including a piston body, a connection portion and a neck portion connected between the piston body and the connection portion, the second end of the resilient member connected to the connection portion, the piston body having a recess and at least one opening penetrating through the piston body, the connection portion having at least one notch corresponding in position to the opening, a gap defined between the piston and an inner periphery of the interior space, said connection portion including a first plate and a second plate which is perpendicularly connected to said first plate, said second end of the resilient member being connected to said first plate and said second plate;
    a control valve movably connected to the neck portion of the piston and having a contact surface which faces the opening of the piston body;
    a piston rod located in the interior space and having a first end and a second end opposite to the first end, the first end of the piston rod engaged with the recess of the piston body and the second end of the piston rod extending out from the second end of the cylinder;
    a cover assembly sealing the second hole in the second end of the cylinder and including a hollow mounting member which is fixed to the cylinder, a first resilient ring received in the mounting member and connected with the piston rod, and a second resilient ring fitted on an outside of the mounting member and in contact with the inner periphery of the interior space, and
    a damping member located between the piston and the cover assembly.

2. The damping device as claimed in claim 1, wherein the damping medium is fluid.

3. The damping device as claimed in claim 1, wherein the control valve is a C-shaped metal plate.

4. The damping device as claimed in claim 1, wherein the damping member is a sponge.

5. The damping device as claimed in claim 1, further comprising a support member located in the interior space, the support member including a first end plate, a second end plate, a connection plate which is connected between the first end plate and the second end plate, and a space defined among the first end plate, the second end plate, and the connection plate, the damping member being received in the space.

6. The damping device as claimed in claim 5, wherein the first end plate and the second end plate have through holes for insertion of the piston rod.

7. The damping device as claimed in claim 1, wherein the inner periphery of the interior space of the cylinder is formed with a shoulder and one end of a support member located in the interior space is engaged with the shoulder, the support member including a first end plate, a second end plate, a connection plate which is connected between the first end plate and the second end plate, and a space defined among the first end plate, the second end plate, and the connection plate, the damping member being received in the space.

8. A damping device comprising:
a cylinder having a first end and a second end opposite to the first end, an interior space defined within the cylinder, the first end having a first hole interconnecting with the interior space, the second end having a second hole interconnecting with the interior space, damping medium filled within the interior space;
a resilient member located in the interior space and having a first end and a second end opposite to the first end, the first end of the resilient member contacting against an inside of the first end of the cylinder;
a seal member sealing the first hole in the first end of the cylinder;
a piston movably received in the interior space and urged by the second end of the resilient member, the piston including a piston body, a connection portion and a neck portion connected between the piston body and the connection portion, the second end of the resilient member connected to the connection portion, the piston body having a recess and at least one opening penetrating through the piston body, the connection portion having at least one notch corresponding in position to the opening, a gap defined between the piston and an inner periphery of the interior space;
a control valve movably connected to the neck portion of the piston and having a contact surface which faces the opening of the piston body, said control valve being a C-shaped metal plate;
a piston rod located in the interior space and having a first end and a second end opposite to the first end, the first end of the piston rod engaged with the recess of the piston body and the second end of the piston rod extending out from the second end of the cylinder;
a cover assembly sealing the second hole in the second end of the cylinder and including a hollow mounting member which is fixed to the cylinder, a first resilient ring received in the mounting member and connected with the piston rod, and a second resilient ring fitted on an outside of the mounting member and in contact with the inner periphery of the interior space, and
a damping member located between the piston and the cover assembly.

9. The damping device as claimed in claim 8, wherein the damping medium is fluid.

10. The damping device as claimed in claim 8, wherein the connection portion includes a first plate and a second plate which is perpendicularly connected to the first plate, the second end of the resilient member being connected to the first plate and the second plate.

11. The damping device as claimed in claim 8, wherein the damping member is a sponge.

12. The damping device as claimed in claim 8, further comprising a support member located in the interior space, the support member including a first end plate, a second end plate, a connection plate which is connected between the first end plate and the second end plate, and a space defined among the first end plate, the second end plate, and the connection plate, the damping member being received in the space.

13. The damping device as claimed in claim 12, wherein the first end plate and the second end plate have through holes for insertion of the piston rod.

14. The damping device as claimed in claim 8, wherein the inner periphery of the interior space of the cylinder is formed with a shoulder and one end of a support member located in the interior space is engaged with the shoulder, the support member including a first end plate, a second end plate, a connection plate which is connected between the first end plate and the second end plate, and a space defined among the first end plate, the second end plate, and the connection plate, the damping member being received in the space.

\* \* \* \* \*